Feb. 19, 1935.   P. L. ALGER   1,992,050
METHOD OF AND APPARATUS FOR STARTING ALTERNATING CURRENT MOTORS
Original Filed Feb. 25, 1930   2 Sheets-Sheet 1
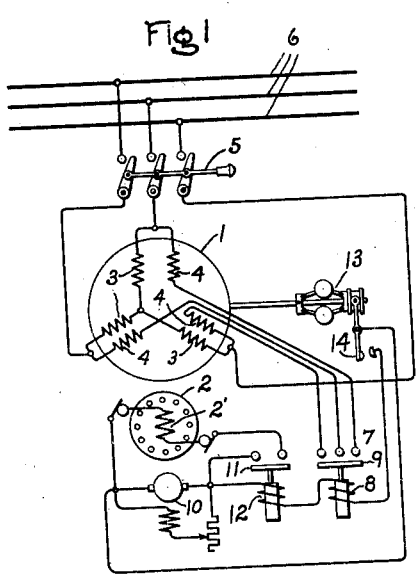
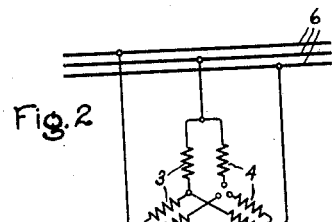
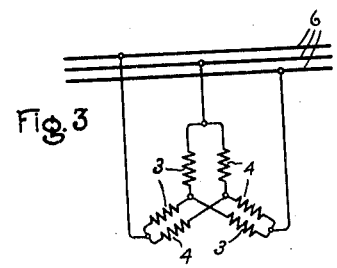
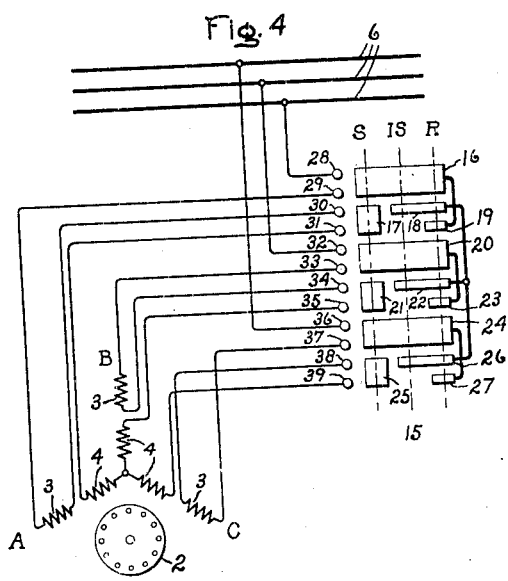
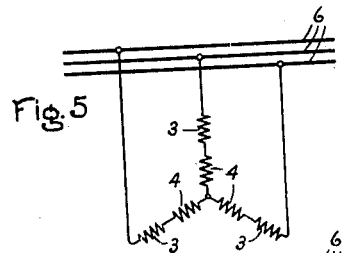
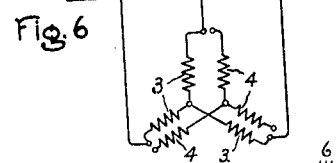
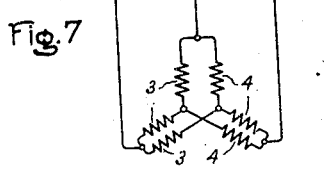
Inventor:
Philip L. Alger,
by Charles E. Tullar
His Attorney.

Feb. 19, 1935.  P. L. ALGER  1,992,050
METHOD OF AND APPARATUS FOR STARTING ALTERNATING CURRENT MOTORS
Original Filed Feb. 25, 1930  2 Sheets-Sheet 2
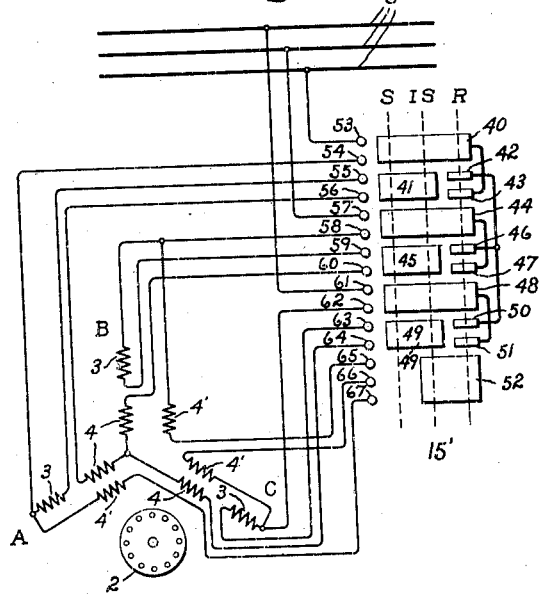
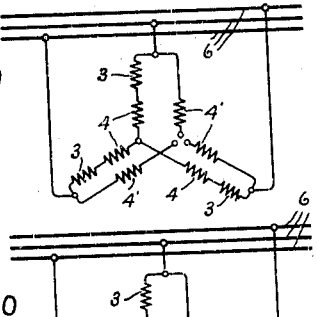
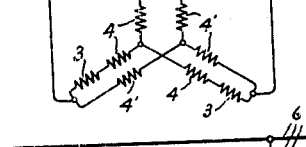
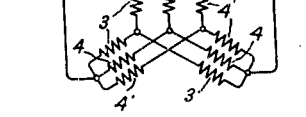
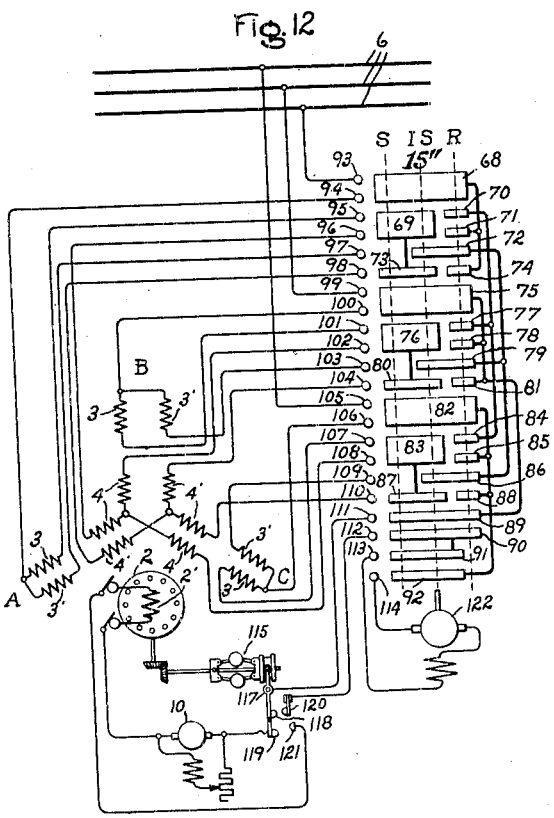
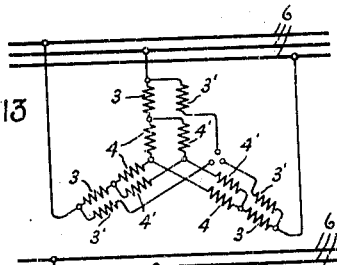
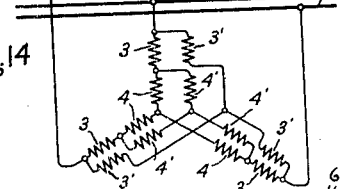
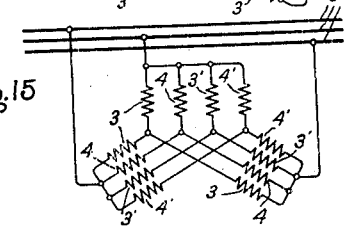
Inventor:
Philip L. Alger,
by Charles E. Tullar
His Attorney.

Patented Feb. 19, 1935

1,992,050

UNITED STATES PATENT OFFICE 1,992,050

METHOD OF AND APPARATUS FOR STARTING ALTERNATING-CURRENT MOTORS

Philip L. Alger, Schenectady, N. Y., assignor to General Electric Company, a corporation of New York Application February 25, 1930, Serial No. 431,322
Renewal July 13, 1934

6 Claims. (Cl. 172—274)

My invention relates to a method of and apparatus for the starting of electric motors, and more particularly to the starting of synchronous or asynchronous alternating current motors having a plurality of electrically independent similar phase circuits on the stator.

In the past it has been customary to start alternating current motors with a starting compensator or auto-transformer which has an intermediate tap or taps to which the motor terminals are connected and after the motor has obtained nearly its full speed, its terminals may be connected directly to the full line voltage. Obviously this method of starting necessitates extra equipment and results in abnormal current peaks when the circuit is interrupted to change from one tap to another or to full line voltage. Another arrangement which has been used to obtain reduced starting potential is the star-delta method in which the full line voltage is applied to the motor winding connected in star for the starting condition and connected in delta for the running condition. This method gives but one starting voltage and requires that the motor windings be wound for full line voltage in the delta connection. Furthermore, the starting current must be interrupted during the transition from the star to the delta connection and abnormal current peaks occur at the transition point particularly if the change occurs before normal speed is attained. Other methods of starting have been proposed for motors equipped with a plurality of winding sections for each phase winding wherein the winding sections are connected in series and then in parallel during the starting and accelerating cycle but these arrangements require interruption of the motor circuit in going from the series to the parallel connection with abnormal current peaks incident to closing the circuit from a high to a low impedance before the motor has attained normal speed. A great many other schemes, involving rearranging the stator winding for different connections for starting and running characteristics, have been proposed in the past both in this country and abroad, but, because of the complexity of their switching arrangement and the necessity for opening the circuit some time during the starting cycle, and reclosing with a low impedance connection, these arrangements are not generally preferred to the starting compensator.

It is an object of my invention to provide a new and improved method, and simple arrangement of apparatus, for starting alternating current motors with full primary voltage applied to the motor terminals without interrupting the starting current, or if the starting current is interrupted, without causing the usual abnormal current peaks at any transition point in the starting and accelerating cycle, and without the use of expensive and complicated apparatus which has been used in the past.

Another object of my invention is to provide a new and improved method for starting alternating current motors provided with a primary winding equipped with polyphase windings having a plurality of independent similar phase circuits on the stator whereby different circuits may be active at different times and in different combinations, singly, in series, in series parallel and in parallel during the starting and accelerating cycle without interrupting the starting current, or if the starting current is interrupted, without causing abnormal current peaks at the transition points.

The novel features which I believe to be characteristic of my invention are set forth with particularity in the appended claims. The invention itself, however both as to organization and method of operation together with further objects and advantages thereof, will best be understood by reference to the following description taken in connection with the accompanying drawings in which Fig. 1 diagrammatically illustrates the circuits for starting a three phase double-winding synchronous motor in accordance with the part winding method of starting motors, Figs. 2 and 3 show diagrammatically the connections for the various steps used in starting the motor, Fig. 4 shows a modification which in accordance with my invention may be introduced into the method of starting a double-winding motor shown in Fig. 1, Figs. 5, 6, and 7 show diagrammatically the connections for the various steps used in the modification shown in Fig. 4, Fig. 8 shows a further modification which in accordance with my invention may be used for starting a three-winding motor, Figs. 9, 10, and 11 show diagrammatically the connections for the various steps used in the modification shown in Fig. 8, and Fig. 12 shows a still further modification which in accordance with my invention may be used for starting a four-winding motor with Figs. 13, 14, and 15 showing diagrammatically the various steps used in the modification shown in Fig. 12.

While my invention in its broader aspects contemplates the use of known types of multiple-circuit motor windings suitable for use with some of the circuits idle during a portion of the starting cycle, such as the standard multiple-circuit type of winding having alternate poles connected in series, I find that if the best starting conditions are to be obtained the most suitable winding is of the type described and claimed in an application for United States Letters Patent of Delmar D. Chase, Serial No. 276,467, filed May 9, 1928, or of the type of winding described and claimed in my application, Serial No. 410,209, filed November 27, 1929, both of which are assigned to the same assignee as this application. The type of winding described and claimed in the afore-mentioned Delmar D. Chase application consists of a plurality of separate circuits for each phase interleaved in different slots around the complete periphery of the stator core and having the lead of the coil sides of different circuits alternated in different phase belts in order to obtain a predetermined relation between the magnitude and phase of the voltages of circuits of corresponding phase, which relation is ordinarily an equal and in-phase relation of the voltages of the circuits of a given phase. For example, with a double-winding dynamo-electric machine having the standard stator core structure two electrically independent circuits are provided for each phase with the coil sides arranged in alternate slots or alternate groups of slots around the complete periphery of the stator core, and the lead of the circuits are alternated in adjacent phase belts for two or more pole machines or with machines with more than two poles the alternation in lead of coil sides may be made every predetermined number of groups of poles, for example every two succeeding poles. A simple embodiment of the type of winding described and claimed in my afore-mentioned application for a double-winding dynamo-electric machine having the standard stator core structure comprises a winding arrangement in which each phase belt is divided into two approximately equal portions, of which one portion is assigned to each electrically independent circuit, and the sequence of half phase belts in each circuit is so selected as to give perfect circuit and phase balance, while minimizing the number of slots carrying coil sides of different circuits. This type of winding I have designated as a "split belt" winding while the type of winding disclosed in the aforementioned Chase application will be referred to as the "alternate-slot" type of winding. In carrying my invention into practice I have found that either the alternate-slot or split-belt type of winding may be used equally well but the selection of the type of winding, particularly when more than two circuits are required, will be determined largely by the number of slots, coil pitch and other design details of the motor to be constructed.

In the application of my invention to a motor comprising a three-phase-wound stator, the system which forms the subject matter of the invention is based on the principle of the division of each phase of the stator winding into a plurality of electrically independent circuits, which may be connected in different ways during the starting of the motor with a view to obtaining the combinations of winding enumerated below:

(1) For a double winding machine each phase is divided into two electrically independent circuits, which are first connected in series across the supply circuit, one of the circuits is then connected directly to the supply circuit while the other is idle, and finally the idle circuit is connected in parallel with the single circuit previously connected. The starting current is interrupted but the circuit is reclosed through a high reactance thus reducing the current peaks.

(2) For a three-winding machine each phase is divided into three electrically independent circuits, two circuits are first connected in series across the supply circuit while the third circuit is idle, then as the motor speed increases the third circuit is connected in parallel with the two series connected circuits, and finally as the motor approaches normal speed the third circuit is maintained connected while all the circuits are placed in parallel, the various changes being made without interrupting the starting current.

(3) For a four-winding machine each phase is divided into four electrically independent circuits, one circuit is connected in series relation with two circuits in parallel directly across the supply circuit while the fourth circuit is idle, the fourth circuit is then connected in parallel with the series-parallel group, and finally as the motor approaches normal speed the fourth circuit is maintained connected while the series-parallel circuits are reconnected and all the windings are placed in parallel across the supply circuit. The various changes are made without interrupting the starting current.

Referring now to Fig. 1, I have diagrammatically illustrated a double-winding synchronous motor 1, comprising a secondary member 2 of the squirrel-cage or other suitable type having a direct current exciting winding 2', and a primary winding comprising two electrically independent three-phase circuits 3 and 4. The circuit 3 is connected in star and has one set of terminals connected to the contacts of a switch 5 and the other set of terminals connected together to form the star connection. The switch 5 in turn is arranged to connect the motor terminals to a three phase supply circuit diagrammatically illustrated by the conductors 6. One set of terminals of the circuit 4 is connected to the corresponding terminals of circuit 3 and the other set of terminals for forming the neutral connection of circuits 4 are brought out of the motor and connected to the contacts of a switch 7. It will of course be obvious to those skilled in the art that the neutral connection could be made and the other terminals of circuit 4 brought out, and after the motor is up to speed connected to the supply circuit as shown in Fig. 6. Furthermore, it will be apparent that this arrangement is not limited to a star connection of the various circuits in the embodiment illustrated in Figs. 1-3 or in the embodiments of my invention illustrated in the remaining figures, since other connections of the circuits, such as the delta connection, may be employed, if preferred, without departing from my invention in its broader aspects. The switch 7 is provided with an operating winding 8 for moving a member 9 to close or open the contacts 7. The field winding 2' is connected to be energized by any suitable means illustrated as a shunt-wound dynamo-electric machine or exciter 10. A switch 11 provided with an operating winding 12 is arranged for closing the circuit of the field winding 2' when the secondary member reaches a predetermined speed. As shown the operating winding 8 of the switch 7 and the operating winding 12 of the field switch are connected in series across the armature of exciter 10 and the circuit therethrough is closed in accordance with the speed of the rotor when a predetermined relation exists between the speed of the motor rotor and its synchronous speed. For this purpose I have illustrated a centrifugal speed device 13 which is arranged to close a switch 14 connected in series with the circuit of the operating windings 8 and 12, although it will occur to those skilled in the art that well known electrical means responsive to field current conditions or synchronism indicating means could be used for closing the circuit of the switch operating windings, when the rotor reaches a predetermined speed or a predetermined relation exists between the rotor speed and synchronous speed.

The method of starting motor 1, assuming all the switches to be in the illustrated positions, consists in first closing switch 5. This connects circuit 3 in star directly across the supply circuit 6 with circuit 4 open at its neutral connection and therefore idle as illustrated in Fig. 2. Under these conditions at start the motor will have approximately 3/2 as much reactance as if full voltage were applied to both circuits in parallel, 2/3 the value of current, and 4/9 the torque. The numerical values cited may vary considerably depending on the winding arrangement, the characteristics of the squirrel cage, and other design features of the motor, but they are representative of usual conditions. When the motor rotor approaches nearly normal or synchronous speed the neutral end connections of the circuit 4 and the circuit through the field winding 2' are closed and the motor will then pull into synchronism and operate with two star connected circuits in parallel having independent neutrals. Although the neutrals could be interconnected it is preferable to keep the neutral connections electrically independent in order to give better protection in case of grounds or faults developing in one of the circuits and to reduce the required number of switch contacts. Although the field winding circuit and neutral switch may be a simple hand type and manually operated I have shown how the motor can be started and pulled into synchronism automatically if the centrifugal switch 13 or other speed responsive device is arranged to close contacts 14 as the motor rotor approaches synchronous speed. In the event of switch 14 closing the operating windings 8 and 12 will be energized and the field circuit will be closed simultaneously with the closing of the neutral connections of circuit 4. The final motor connections for the running condition are illustrated in Fig. 3. It will thus be observed that the motor is started from full applied voltage with 2/3 the current corresponding to full applied voltage with the standard machine with a corresponding reduction in torque but without interrupting the starting current and without the consequent current peaks during the starting cycle. This arrangement is particularly applicable for use where standard synchronous and induction motors have a higher starting current than allowable, but yet have ample starting torque. There are a number of applications where it is desirable to have a lower starting torque, as well as a lower starting current, as for example, on 25 cycle compressor motors. There are other cases where the starting torque is not particularly important but where it is desired to reduce the starting current. In these cases, this method of starting will give the desired result with less cost and with more reliability than a starting compensator and offers the further advantage that the supply circuit is never opened after it is once closed.

In Fig. 4 I have shown an embodiment of my invention which is a modification of the arrangement and method disclosed in Fig. 1 which consists in arranging the stator circuits first in series, then connecting a single circuit across the supply circuit with one circuit idle, and finally connecting the two circuits in parallel across the supply circuit. The motor is diagrammatically illustrated as a motor of the double winding type as shown in Fig. 1, and for purposes of comparison I have used the same numerals to designate corresponding circuits and have also designated the phases proceeding in a clockwise direction from the left as viewed in the drawing as A, B, and C, respectively. For purposes of simplicity I have omitted the diagrammatic showing of the field winding 2' for synchronous motor operation, but since the motor may also be an induction motor and the details of the rotor structure form no part of my invention, it is believed this very diagrammatic representation will be sufficient for readily understanding the invention.

Although it will be obvious that the connections for the various steps used in the embodiments of my invention diagrammatically illustrated in Fig. 4 can be effected by separate manually operated switches I have shown a more convenient arrangement conventionally illustrated in accordance with long established practice as a controller 15 arranged so as to make the desired connections by means of a cylinder of the usual type, capable of rotating about its axis and carrying with it contact segments numbered from 16 to 27, inclusive, insulated from each other, except those shown interconnected, and arranged in such a manner as to come in contact with stationary rubbing contacts numbered 28 to 39 inclusive which are placed in operative relation with the cylinder of controller 15. The three operating positions of the controller are indicated by the broken lines designated S for starting, IS for intermediate starting and R for running. Figs. 5, 6, and 7 show diagrammatically the connections for the three operating positions of the controller, S, IS, and R, respectively. For position S, the circuits 3 and 4 are connected in series across the supply circuit, in position IS circuit 3 is connected across the supply circuit and circuit 4 has one set of terminals disconnected from the line terminals of circuit 3 and is therefore idle even though its neutral connections are closed, and in the position R the outer terminals of circuit 4 are connected to the outer terminals of circuit 3, thereby placing circuits 3 and 4 in parallel across the supply circuit with independent neutrals. The sequence of connections will be better understood by tracing the circuit connections effected by controller 15 of one phase, for example phase A. When controller 15 is moved to the S position a circuit is completed from the lower phase conductor of circuit 6 to contact 28 through segment 16 to contact 29 and thence to the line terminal of circuit 3. The other terminal of circuit 3 is connected to contact 30 and through segment 17 is connected to the outer terminal of circuit 4 and the circuit is then traced through circuit 4 to the neutral connection. As will be observed this connects circuits 3 and 4 of phase A in series. The outer terminals of phases B and C of circuit 3 are connected to the remaining phase conductors of supply circuit 6 through contacts 32 and 33 and segment 20, and contacts 36 and 37 and segment 24, respectively, while the series connection of the respective circuits of phases B and C is effected through contacts 34 and 35 and segment 21, and contacts 38 and 39 and segment 25, respectively.

As the motor speed increases the controller 15 is moved to the position IS and the following connections are made. The outer terminals of circuit 3 are maintained in contact with the supply circuit 6 but the terminals previously connected to the outer terminals of circuit 4 are interconnected to form a neutral thus placing circuit 3 in a star connection across the supply circuit 6. The neutral connection of circuit 4 remains closed but the outer terminals are disconnected from the supply circuit and circuit 4 is therefore idle. Although the starting current is interrupted during this transition only small current peaks result because the circuit is reclosed through circuit 3 acting alone which offers a high reactance. Immediately thereafter the controller 15 is moved to the R or running position and the outer terminals of circuit 4 are closed to the outer terminals of circuit 3 and thus to the supply circuit 6. In the S position the motor will have approximately four times more reactance than if full voltage were applied to a single circuit winding, ¼ the value of current and ¼ the torque.

In Fig. 8 I have shown a modification of the embodiment of my invention shown in Fig. 4 which is particularly applicable for use with large size motors. In this instance the motor is provided with three independent similar phase circuits. For purposes of comparison I have used the same numeral designation for two of the circuits, namely 3 and 4, while the third circuit is designated 4'. The controller is shown similarly to controller 15 and is designated as 15' with contact segments numbered 40 to 52 inclusive and stationary rubbing contacts numbered 53 to 67 inclusive.

The first step in the method of starting in this modification is the same as in the embodiment of my invention diagrammatically illustrated in Fig. 4, namely, circuits 3 and 4 are connected in series across the supply circuit when the controller is moved to the S or starting position. Circuit 4' in this case has its center terminals connected to the outer terminals of circuit 3 but its neutral connections are open and hence circuit 4' is idle in the first position of the controller. The connections for this position are shown in Fig. 9. As the motor speed increases the controller is moved to the IS position and the neutral terminals of circuit 4' are interconnected and thus circuit 4' is connected in parallel with the circuits 3 and 4 connected in series as shown in Fig. 10. As the motor approaches its predetermined normal speed or synchronous speed, as the case may be for induction motor or synchronous motor, the controller is moved to the R or running position. During this transition from the IS to the R position the starting current is not interrupted because circuit 4' is maintained connected to the supply circuit 6 but circuits 3 and 4 are reconnected so that circuits 3, 4 and 4' are placed in parallel across the supply circuit with independent neutrals as shown diagrammatically in Fig. 11. In the S or starting position the motor will have approximately five times more reactance than if full voltage were applied to a single circuit winding ⅕ the current, and ½ the torque, the actual values varying considerably depending on the winding arrangement and other features of design. It is obvious that I could also make the initial connection with this winding arrangement with all three circuits in series, similarly to the embodiment of my invention illustrated in Figs. 4, 5, and 6, obtaining approximately ⅓ normal current and ⅓ torque, and subsequently reconnect the windings in the order illustrated in Figs. 9, 10, and 11, if the decreased initial current were valued sufficiently to warrant the increased complication.

In Fig. 12 I show another modification of the embodiments of my invention previously described which is also particularly applicable for use with large size motors. In this instance the motor is provided with four independent similar phase circuits. For purposes of comparison I have used the same numeral designation for three of the circuits, namely 3, 4, and 4', while the fourth circuit is designated 3' since it is similarly situated to circuit 3. The controller is shown similar to controller 15 and is designated as 15" with contact segments numbered 68 to 92 inclusive and stationary rubbing contacts numbered 93 to 114 inclusive.

While it will be readily understood that the controller 15" may be operated manually from the S to the R position I have also diagrammatically shown means for operating the controller automatically after it has been moved initially into the start position, in order to effect automatically in response to rotor speed reconnection of the stator windings at the IS and R positions and energization of the motor field winding as the motor pulls into synchronism. A speed responsive device 115 which is connected to be operated from the rotor 2 is arranged to operate a switch device 117 carrying two contacts 118 and 119 which are suitably insulated from each other. The switch contact 118 is arranged to make engagement with a spring mounted contact 120 as the motor comes up to a predetermined sub-synchronous speed and contact 119 is arranged to make engagements with contact 121 to complete a circuit for the field circuit 2' as the motor approaches synchronous speed. Contact 117 is connected to a controller contact 111 and its cooperating contact is connected to controller contact 112. These controller contacts cooperate with segments 89 and 90, of which 89 is connected to one phase conductor of the supply circuit 6. Contacts 113 and 114 are connected to the terminals of a suitable pilot motor 122 which as shown is of the alternating current commutator type. These last mentioned controller contacts cooperate with segments 91 and 92, respectively. Segment 91 is connected to segment 90 and segment 92 is connected to another phase conductor of supply circuit 6.

When the controller is moved manually to the S position and the motor has reached a predetermined synchronous speed a circuit is made from the middle phase conductor of circuit 6 to contact 99, segment 75, segment 89, contact 111, speed switch contacts 117 and 120, controller contact 112, segment 90, segment 91, controller contact 113, through motor 122 to controller contact 114, segment 92, and thence to the upper phase conductor of circuit 6 through segment 82 and contact 105. In other words, a circuit is completed for pilot motor 122 as soon as speed switch contacts 117 and 120 are in engagement. The pilot motor 122 operates the controller through the IS to the R position and as the main motor approaches its synchronous speed the speed switch contacts 119 and 121 come into engagement and complete an energizing circuit for field winding 2'. As the controller reaches the run position the circuit through pilot motor 122 is interrupted at segments 91 and 92 and the controller remains in the run position.

The first step in the method of starting in this modification is effected when controller 15'' is moved to the S position and consists in connecting circuit 3 in series with circuits 4 and 4' which in turn are connected in parallel with independent neutral connections. The remaining circuit, namely 3', has one set of terminals connected to the outer terminals of circuit 3 but its neutral connection is left open and therefore circuit 3' is idle. The resulting connections for this position of the controller are shown diagrammatically in Fig. 13. As the motor speed increases the controller is moved to the IS position and the neutral terminals of circuit 3' are interconnected and thus circuit 3' is connected in parallel with the series parallel group of circuit 3 and circuits 4 and 4'. The resulting connections for this position of the controller are shown in Fig. 14. As the motor approaches its predetermined normal speed or synchronous speed, as the case may be, for induction motor or synchronous motor, the controller is moved to the R or running position. During this transition from the IS to the R position the starting current is not interrupted because circuit 3' is maintained connected to the supply circuit 6 but circuits 3, 4, and 4' are reconnected so that circuits 3, 4, 3', and 4' are placed in parallel across the supply circuit 6 as diagrammatically shown in Fig. 15. In the S or starting position the motor will have approximately five times more reactance than if full voltage were applied to a single circuit winding, ⅕ the current, and ¼ the torque.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. The method of starting a polyphase motor having a plurality of electrically independent circuits in each of its stator phases, which consists in first operating the motor with a predetermined number of circuits in each phase in series and the phases in star, then operating the motor with one circuit energized with the phases in star and the other circuits idle, and then connecting the said other circuits in parallel with the first circuit without interrupting the starting current.

2. The method of starting a polyphase motor having a plurality of electrically independent circuits in each of its stator phases which consists in first operating the motor with some of the circuits in each phase in series and the phases in star with the remaining circuits idle, then operating the motor with the remaining circuits in parallel with the series connected circuits, then opening the circuits of the series connected circuits while maintaining the remaining circuits energized, and then connecting all the circuits in parallel without interrupting the starting current.

3. The method of starting a polyphase motor having a plurality of electrically independent circuits in each of its stator phases which consists in first operating the motor with one group of circuits in series and the phases in star, a second group of circuits connected in star and in parallel with said one group, and a third group of circuits remaining idle, then connecting said third group of circuits in parallel with said first two groups, then opening the circuits of the first two groups while maintaining the third group energized, and then connecting all of the circuits in parallel without interrupting the starting current.

4. The method of starting an electric motor having a polyphase primary winding each phase of which comprises two winding sections which comprises connecting at least a portion of one of said sections in series with at least a portion of the other section to form a series circuit, supplying current to said circuit, then interrupting said series connection and supplying current to only one of said sections of each phase, and then connecting both of said sections in parallel and supplying current thereto.

5. The method of starting a polyphase motor having a polyphase winding each phase of which comprises a plurality of winding sections which consists in first energizing a winding section of each phase in series with another winding section of the same phase, then energizing only one winding section of each phase, and then energizing each winding section in parallel with the other winding sections of the same phase.

6. The method of starting a polyphase motor having a polyphase winding each phase of which comprises a plurality of winding sections which consists in first energizing a winding section of each phase in series with another winding section of the same phase and with the other winding sections idle, then operating the motor with the remaining winding sections in parallel with the series connected winding sections of the same phase, then opening the circuits of the series connected winding section, and then connecting all of the winding sections of each phase in parallel.

PHILIP L. ALGER.